Figure 1:
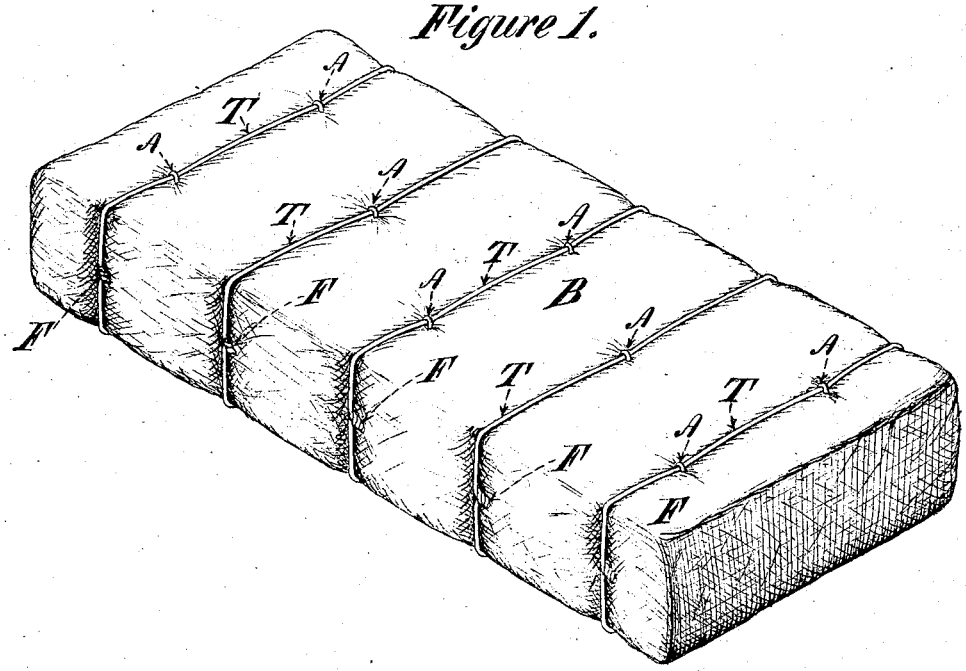
Figure 2:
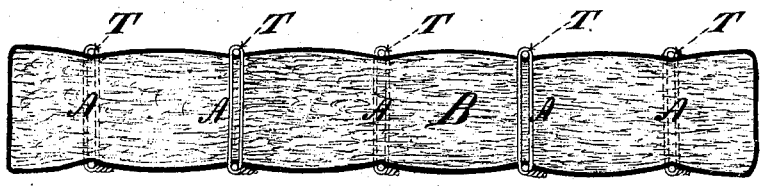

L. BELDEN.
Process of Baling Cotton.

No. 197,817.   Patented Dec. 4, 1877.

Witnesses:
J. H. Harrah
Wm. J. Sawyer

Inventor:
Leslie Belden
by his attorney
E. N. Dickerson Jr.

UNITED STATES PATENT OFFICE.

LESLIE BELDEN, OF NEW YORK, N. Y.

IMPROVEMENT IN PROCESSES OF BALING COTTON.

Specification forming part of Letters Patent No. 197,817, dated December 4, 1877; application filed October 15, 1877.

*To all whom it may concern:*

Be it known that I, LESLIE BELDEN, of the city and county of New York, have invented a new and useful Process of Baling Cotton, of which the following is a full, true, and accurate description, reference being had to the accompanying drawings.

It is well known, in order to transport cotton in its crude or raw state, that it is customary to compress the same under great pressure in bales. These cotton-bales are usually confined by what are known as "bale-ties," which consist of straps of flexible material, usually steel or iron, which laterally surround the bale.

The process by which these ties are applied is as follows: The cotton is first compressed between two platens in a powerful press, thereby giving it the shape of a rectangular prism or brick; then, while under pressure, the bale-ties above mentioned are applied to and surround the cotton-bale. The pressure is then relieved, and the following consequence necessarily ensues: It is well known to mathematicians that a circle contains the greatest area in proportion to its circumference or containing line of any form or figure. Therefore, as soon as the pressure upon the cotton-bale is released, the cotton, being elastic and tending to occupy the greatest possible space, will, owing to this law, tend to cause the surrounding bale-tie to assume a circular form, and, therefore, the released bale will be approximately cylindrical in shape. Bales of a cylindrical shape are very ill adapted to storing in narrow space, and where it is necessary, as in the case of cotton to transport materials to great distances, the space occupied in storing them becomes a matter of great importance.

It is also impossible to compress cotton beyond a certain point and restrain it by the bale-ties in use, and my invention practically increases the strength of the bale-tie by decreasing the expanding pressure of the cotton upon it.

My invention can be readily understood from the figures, in which similar letters refer to similar parts.

B represents, generally, a cotton-bale, though it is obvious that other materials besides cotton can be similarly baled. T represents the surrounding bale-tie. A represents a transverse clamp, which passes through the substance of the bale and connects the bale-ties on the opposite sides of the bale, and prevents their taking a circular form. A sufficient number of these clamps are used to give to the bale a practically rectangular shape, having its opposite sides parallel, as is clearly shown in Figure 1. These transverse clamps or stays, as they may be called, may be of various shapes and various materials, provided they perform the function of preventing the lateral or transverse expansion of the cotton.

The bale shown in Fig. 1 is formed as follows: The ties T are first placed around the bale in its expanded condition before being put into the press. At the same time the transverse clamps A, which are formed of a wire somewhat smaller than that composing the bale-ties, is looped around such ties and drawn through the bale by means of needles; or a sufficiently thick wire to make its own way may be used. The loose bale of cotton is then put in the press and compressed till it takes the shape shown in Fig. 1. The bale-ties T are then drawn tight and fastened, which may be done in various ways. In the drawing the ends are shown, at F, firmly twisted together; but they may be fastened by means of buckles, or in any other suitable ways. Then the wire forming the transverse clamps A is drawn tight and looped around the same tie, as is clearly shown in the drawings. The press is then raised, when it is evident that the cotton cannot expand vertically, being restrained by the surrounding bale-ties, the opposite sides of which bale-ties are kept parallel by means of the clamps herein shown, so that the bale retains the same square or rectangular shape which it had in the press, instead of expanding into a cylindrical form, as is usually the case.

Another advantage besides the saving of space on shipboard results from this method of baling cotton—namely, the saving of the ballast, which is now necessarily carried by cotton-ships. This carrying of ballast is due to the fact that the ships cannot be sufficiently loaded by the loosely-packed bales of cotton heretofore shipped, while, when cotton is baled by my process, the increased density in proportion to the cubic capacity renders any additional ballast unnecessary.

It is obvious that all materials, such as wool, which are not injured by the passage of the clamps through them, can be baled in this way. It is likewise plain that it is unnecessary that the transverse clamps be attached to the bale-ties, although this is the better way. The transverse clamps might be attached to plates or similar structures resting upon the surfaces of the bale, and thereby the same result might be obtained, which is that of rendering the opposite surfaces of the bale approximately parallel planes. It is plain that the ties or clamps need not be put in position till after the cotton is compressed in the press; and with proper mechanism it is more convenient to first compress the cotton, then put the ties and clamps in position, and draw them tight.

What I claim as my invention, and desire to secure by Letters Patent, is—

1. The process of baling cotton hereinbefore described, which consists in first reducing the mass of cotton to a rectangular prism by means of a press, and of then binding around it a series of ties, which ties are held together by transverse clamps passing through the substance of the bale, and put in position when the cotton is still compressed in the press.

2. As a new product, a bale of cotton having approximately the shape of a rectangular prism, as distinguished from a bale of cotton having approximately a cylindrical shape, substantially as described.

3. A bale of cotton having compressing-ties surrounding it laterally, and transverse clamps passing through the substance of the cotton, for the purpose of drawing and holding together the opposite sides of said bale, substantially as described.

4. A bale having the lateral surrounding-ties and transverse clamps passing through the substance of the bale, and attached to said surrounding-ties, substantially as described.

5. A bale having the lateral surrounding-ties T and the transverse clamps A, which clamps consist of a looped wire or cord looped around the surrounding tie, substantially as described.

LESLIE BELDEN.

Witnesses:
  E. N. DICKERSON, Jr.,
  GEO. H. EVANS.